3,461,219
ELECTRIC CABLES
John Derrick Endacott, Sidcup, Kent, and Anthony John Manktelow, Snodland, Kent, England, assignors to British Insulated Callender's Cables Limited, London, England
Filed Apr. 27, 1966, Ser. No. 545,693
Claims priority, application Great Britain, Apr. 30, 1965, 18,326/65
Int. Cl. H01b 7/02, 3/18
U.S. Cl. 174—25         9 Claims

ABSTRACT OF THE DISCLOSURE

During the manufacture of a high voltage electric power cable having a solid dielectric of plastics material, the dielectric is pre-impregnated with a cable gas, for example nitrogen, at an elevated temperature and pressure. Subsequently, and until the cable is installed and put into service, at least the major part of the dielectric remains fully impregnated with the gas. The cable is for use in an installation of the kind in which cable gas at a pressure above atmospheric is maintained in contact with the dielectric. Solid plastics bodies for use as dielectric in joints in the installation can be pre-impregnated in the same way.

---

This invention relates to high voltage electric cable installations and to cables for use in such installations having a solid plastics dielectric which is subjected to gas pressure during operation of the cable by a cable gas which has access to one or more surfaces of the solid plastics dielectric, usually the inner and/or outer surface. By "a cable gas" we mean a gas that is a strong dielectric and chemically inert with respect to the solid plastics dielectric with which it is in contact, or a mixture of such gases. Examples of cable gases are nitrogen, sulphur hexafluoride and electro-negative gases. The solid dielectric need not necessarily form the whole of but preferably does form the whole of the dielectric between the conductor or conductor screen and the dielectric screen of the cable; it is preferably formed by extrusion as a single tubular layer, although it may be formed by extruding successive concentric layers, preferably in such a way that the layers bond to each other.

Whatever precautions are taken in the manufacture of such cables, it is difficult to eliminate all voids from the dielectric wall and from interfaces between the dielectric wall and a screen of conductive plastics material bonded to the surface of the dielectric and forming either a conductor or a dielectric screen. The principal function of the gas is to enter and fill such voids with gas at a pressure such that electrical discharge in the voids is inhibited.

In accordance with the present invention, during the manufacture and/or installation of the cable, the solid dielectric of the cable is exposed to a pressure of a cable gas above atmospheric pressure for a time and at a temperature both so related to the pressure that the dielectric is preimpregnated with the gas to an extent such that, subsequent to such preimpregnation and until the cable is put into service, at least a major part of the solid dielectric remains "fully impregnated" with the gas, as hereinafter defined.

The invention includes the preimpregnation in the same way of preformed solid plastics parts for use as dielectric in joints or terminations of the cable.

The term "fully impregnated" means that a void in any part of the solid dielectric body, or between the solid dielectric body and a conductive body bonded thereto, can be shown by calculation to be filled with the gas at a pressure of at least 100 lbs. per square inch, and preferably at a pressure at least equal to the working gas pressure of the cable, usually 200 lbs./sq. inch, and reference to the gas pressure in a part of the dielectric refers to the calculated gas pressure that would exist in a void in that part of the dielectric were such a void present.

Figure 1:
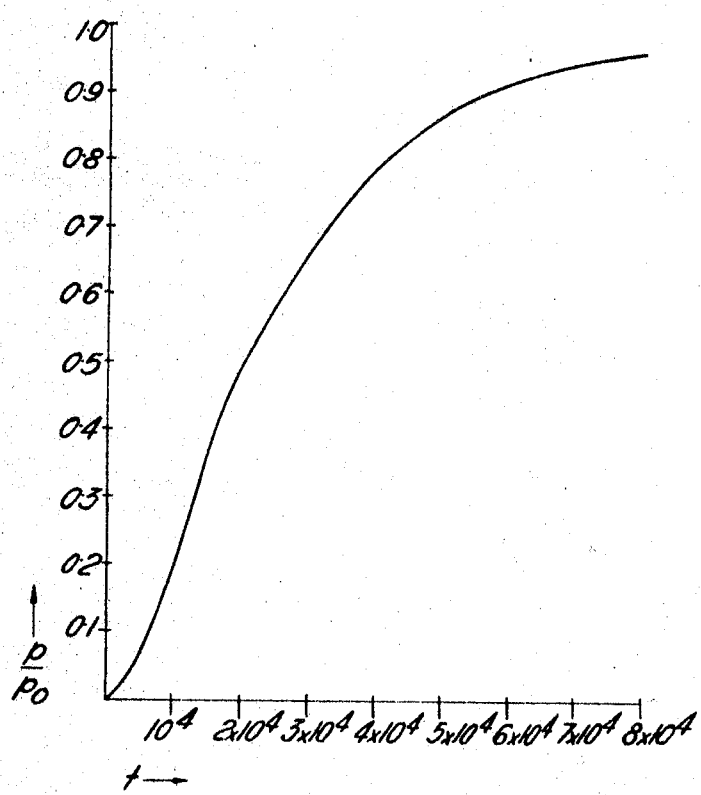
Figure 2:
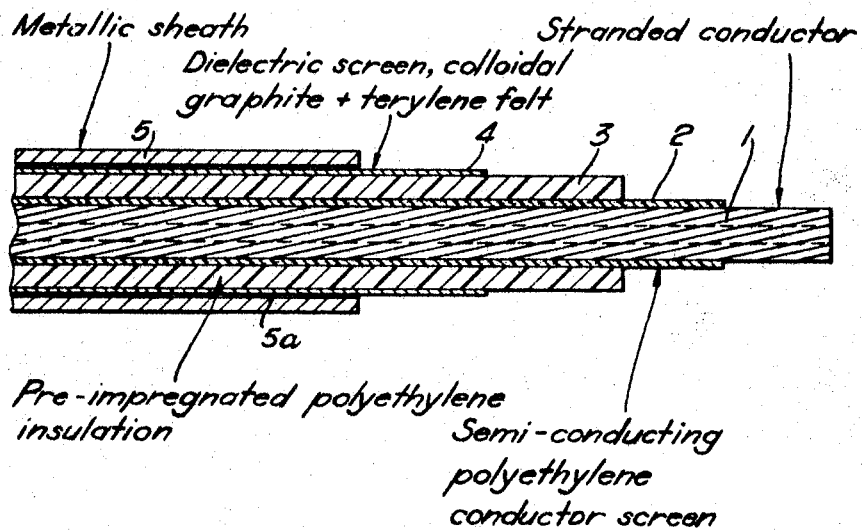
Figure 3:
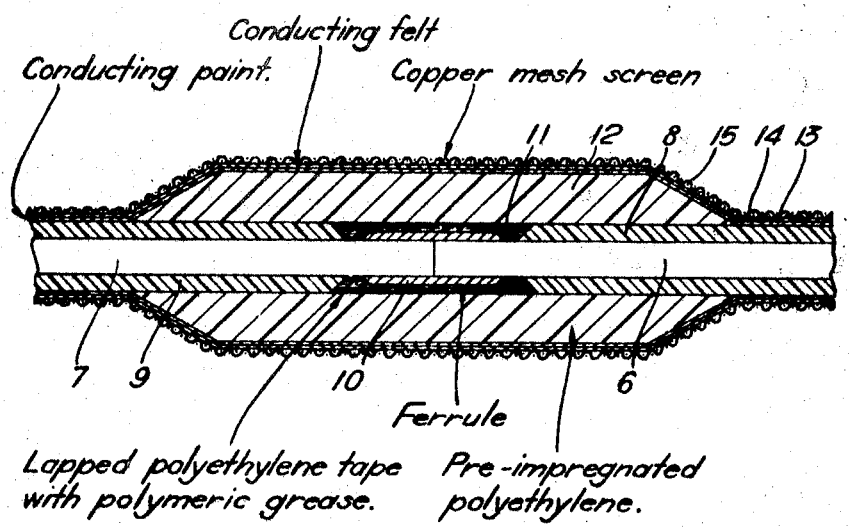

The method of calculation used and cables and installations in accordance with the invention will now be described with reference to the drawings in which FIGURE 1 is a graph and FIGURES 2 and 3 are sectional elevations of the cable and a joint respectively.

The rate of change of pressure in a small void can be estimated by using Fick's first and second laws to find the rate of change of concentration (assumed to be related to the pressure) at the point in the material assumed to be occupied by the void, when the presence of the void is ignored. The calculation can be simplified as applied to a long annular body forming a cable dielectric without undue sacrifice of accuracy by replacing the annulus by a material of the same thickness but with plane parallel faces.

From Fick's laws, it can be shown that $$\frac{\delta p}{\delta t} = D \frac{\delta^2 p}{\delta x^2}$$

where $p$ is the pressure, $t$ the time, $x$ the position-coordinate, and $D$ the diffusivity.

The pressure within a flat body of thickness $2l$ subjected on its surface to a pressure $p_0$ can be obtained by solving this equation with the following initial and boundary conditions:

at $t \leq 0$, $p=0$ for all $x$
at $x=\pm l$, $p=p_0$ for $t>0$

From the solution it will be found that the time taken for the pressure throughout the body to reach a pressure $p$ comparable with $p_0$ is approximately equal to $$\frac{4l^2}{\pi \cdot 2D}$$

The relationship between $p/p_0$ and $t$ in seconds when $l=0.127$ cm. or 0.05 in. and $D=3\times10^{-7}$ cm.$^2$/sec. at 30° C. is shown in the attached graph.

Curves for other values $D'$ and $l'$ of $D$ and $l$ can be obtained by changing the time scale in the ratio $$\frac{t'}{t} = \frac{D}{D'} \cdot \frac{l'^2}{l^2}$$

In this way, the following results for a solid polyethylene dielectric subjected to an external pressure of 50% above the required pressure in the voids are obtained, i.e. $p/p_0 = 2/3$.

| Example: | Impregnation temperature, °C. | Distance of void from surface to which pressure is applied (l) | Impregnation time | |
|---|---|---|---|---|
| | | | Secs. | Hours |
| 1 | 30 | 0.05″ | 3×10⁴ | 83 |
| 2 | 30 | 0.5″ | 3×10⁶ | 8,333 |
| 3 | 100 | 0.5″ | 1.57×10⁵ | 44 |

$D$ at 30° C. is as given above and at 100° C. is $5.73 \times 10^{-6}$ cm.$^2$/sec.

Thus from Examples 2 and 3, full impregnation of a polyethylene layer 1.0 in. thick at 100 lbs./sq. in. is obtained by applying a gas pressure of 150 lbs./sq. in. to both surfaces for about 40 hours at 100° C. or about 8,000 hours at 30° C., and full impregnation at 200 lbs./sq. in. is obtained by applying gas to both surfaces at 300 lbs./sq. in. for the same time and at the same temperatures.

We prefer to accelerate the pre-impregnation process by using a gas pressure above the working pressure of the cable, preferably at least one and a half times the working pressure, and/or raising the temperature of the dielectric to a temperature of at least 60° C. and preferably in the neighbourhood of the maximum working temperature of the dielectric. The pre-impregnation is preferably carried out in the factory before or after the cable is sheathed and the gas pressure in all parts of the dielectric is preferably raised to a pressure sufficiently above the working pressure of the cable to ensure that loss of gas during subsequent handling of the cable involved in manufacture and installation does not cause the gas pressure in the major part of the dielectric to fall below the working pressure. A fall of gas pressure to a value below the working pressure in parts of the dielectric adjacent to its inner and outer surfaces can be tolerated since this can readily be compensated for by further pre-impregnation after installation of the cable and before it is put into service.

We prefer to pre-impregnate the dielectric before sheathing, for example by enclosing the unsheathed cable core in a pressure vessel and subjecting it at an elevated temperature to a gas pressure well above the working pressure. For example, a cable with a dielectric of solid polyethylene intended to operate at a pressure of 200 lbs. per square inch of nitrogen may be subjected to a pressure of nitrogen at 500 lbs. per square inch when heated to a temperature of 80–90° C. The complete impregnation of a dielectric layer of thickness about ½-inch can be obtained under these circumstances in about 12 hours when both the inner and outer surfaces of the dielectric layer are exposed to gas, i.e. when the core has a conductor which is permeable to the gas and any materials applied between the conductor and the dielectric or applied to the outer surface of the dielectric to form a conductor or dielectric screen respectively are permeable to the gas.

Before removal of the core from the pressure chamber for sheathing, it is allowed to cool to atmospheric temperature and at this temperature the rate of diffusion of gas from the dielectric is so low that during the sheathing operation only a small loss of gas pressure occurs and the pressure in only a small part of the dielectric, if any, is likely to fall to a value below the working pressure of the cable, that is in the parts of the dielectric immediately adjacent its inner and outer surfaces. After the sheathing of the cable, further loss of gas can be prevented by sealing the ends of the sheath and filling the space between core and sheath with gas at or above operating pressure. Thereafter, no further loss of gas will take place until jointing operations are commenced. During jointing the fall in pressure of the gas adsorbed in the dielectric can also be kept to a small value and will only occur to a substantial extent adjacent to the inner and outer surfaces of the dielectric and to the exposed ends of the cable length. In accordance with the invention, complete impregnation of the dielectric is restored by subjecting it to a gas pressure equal to or above the working pressure before the cable is put into service.

If the pre-impregnation of the dielectric with gas takes place after sheathing, and if the sheath is of a kind that will not withstand the gas pressure to be applied to the dielectric during pre-impregnation, fluid pressure can be applied to the outside of the sheath to prevent distension. This can be effected by immersing the whole of the cable in the pressure vessel and subjecting it both within and outside the sheath to the gas pressure or by immersing the sheathed cable in a liquid under appropriate pressure and applying gas to the open ends only of the sheathed cable. In the latter case, the vessel may comprise a pipe of greater diameter than and at least equal in length to the cable length or it may be a pipe line in which the sheathed cable is to be installed, the sheath in this latter case acting as a gas impermeable membrane capable of transmitting pressure between the gas within the cable and the gas or liquid surrounding the cable and filling the pipe line. Also, where the cable is to be installed in a pipe line which itself is to be filled with the cable gas and no impermeable membrane is provided between the dielectric and the gas filling the pipe line, the whole of the pre-impregnation can take place after the cable has been drawn into the pipe line, using a pressure considerably above the working pressure of the cable and assisting the diffusion of the gas into the dielectric by heating the cable as by passing an electric current through the conductor or conductors.

When the method in accordance with the invention is applied to a pipe line cable or to a cable provided with a reinforced sheath capable of withstanding a pressure considerably above the working pressure, pre-impregnation can be carried out after the cable lengths have been sheathed or drawn into the pipe line and either before or after jointing and termination procedures have been completed. If the pre-impregnation takes place before jointing and termination any loss of gas during jointing and termination which would result in the gas pressure in any part of the dielectric falling below the working pressure is compensated for, in accordance with the invention, by a further pre-impregnation after the jointing and termination has been completed and before the cable is put into service.

FIGURE 2 shows in sectional elevation the end of a typical cable in accordance with the invention. The stranded conductor 1 which has a central gas duct is provided with a conductor screen 2 of semi-conducting polyethylene, over which is applied a solid dielectric 3 of polyethylene. The dielectric is fully impregnated with nitrogen at 200 lbs./square inch. Over the dielectric 3 is a dielectric screen 4 consisting of "terylene" (polyethylene terephthalate) felt impregnated and coated with colloidal graphite. A metallic sheath 5 surrounds the screened dielectric with sufficient clearance to provide the necessary gas passage 5a along the exterior of the dielectric.

Solid preformed dielectric bodies of plastics material for use in joints and terminations can be pre-impregnated in the factory and delivered to the site in sealed containers. If, as is preferred, they are pre-impregnated with cable gas at a pressure considerably above the working pressure of the cable any loss of gas during jointing operations may not reduce the pressure in any part to a value below the working pressure, but such loss can be made up as necessary before the installation is put into service.

A typical cable joint for use in installations in accordance with the invention is shown in sectional elevation in FIGURE 3. The cable conductors 6, 7, provided with pre-impregnated polyethylene dielectric 8, 9 are connected by a ferrule 10 in accordance with normal practice.

The ferrule 10 is covered with a lapping 11 of polyethylene tape filled with polymeric grease and a preformed body 12 of polyethylene is fitted over the joint. The body 12 and the tape 11 are of fully impregnated polyethylene as are the dielectric layers 8 and 9 on the cable conductors.

A layer 13 of conducting paint electrically interconnects the dielectric screens of the cables and this layer is covered by a layer of graphite loaded felt 14 and a copper mesh screen 15.

The joint is given further protection (not shown) in accordance with normal practice.

Instead of using a preformed body 12 of polyethylene a similar shaped body can be built up in situ from pre-impregnated polyethylene by moulding or by lapping on a preimpregnated tape. When a tape is used, the laminated body is preferably filled with polymeric grease, to exclude air.

The invention is applicable to both single and multicore cables and for multicore cables the pre-impregnation can be carried out before or after laying up the cores or partly before and partly after.

The method of manufacture of a cable in accordance with the invention has the advantage that the cable is put into service in a fully impregnated condition and premature breakdown of the dielectric which may be caused by the existence of voids not containing gas at the full working pressure of the cable is avoided.

What we claim as our invention is:

1. In a method of manufacturing a high voltage electric power cable having a solid plastics dielectric and provided with means for subjecting the cable dielectric during operation of the cable to a pressure above atmospheric by a cable gas which has access to at least one surface of the dielectric, the step of exposing the dielectric during manufacture of the cable and before installation thereof to a pressure of a cable gas above atmospheric pressure at an elevated temperature for a time so related to the pressure and temperature that the dielectric is pre-impregnated with the gas to an extent such that, subsequent to such pre-impregnation and until the cable is put into service, at least the major part of the solid dielectric remains fully impregnated with the gas.

2. A method as claimed in claim 1 in which the dielectric is pre-impregnated before the dielectric is sheathed.

3. A method as claimed in claim 1 in which the dieelectric is pre-impregnated after the dielectric is sheathed and during the pre-impregnation process a fluid under pressure above atmospheric is applied to the outside of the sheath to prevent distension of the sheath.

4. A method as claimed in claim 1 in which the pressure to which the whole of the dielectric has been fully impregnated and that at which at least the major part remains fully impregnated is at least 200 lbs./sq. in 5. A method as claimed in claim 1 in which the dielectric is pre-impregnated at a temperature of at least 60° C.

6. In a method of producing a high voltage electric power cable installation comprising lengths of cable and joints therefor each having a solid plastics dielectric and means for subjecting the cable and joint dielectric during operation to a pressure above atmospheric by a cable gas which has access to at least one surface of the dielectric, the step of exposing the cable dielectric and preformed bodies for use as the dielectric for the joints before installation of the cable to a pressure of a gas above atmospheric pressure at an elevated temperature for a time so related to the pressure and temperature that the dielectric is pre-impregnated with the gas to an extent such that, subsequent to such pre-impregnation and until the cable is put into service, at least the major part of the solid dielectric remains fully impregnated.

7. A method as claimed in claim 6 in which after installation of the cable any part of the dielectric not fully impregnated is further impregnated to the fully impregnated state before the cable is put into service.

8. A high voltage electric power cable comprising a least one conductor, a solid plastics dielectric therefor and means for subjecting the dielectric during operation of the cable to a pressure above atmospheric by a cable gas which has access to at least one surface of the dielectric, the dielectric being pre-impregnated with a cable gas to an extent such that, until the cable is put into service at least a major part of the solid dielectric remains fully impregnated with the gas.

9. A cable as claimed in claim 8 in which the dielectric is of polyethylene.

References Cited

UNITED STATES PATENTS

| | | | |
|---|---|---|---|
| 2,253,984 | 8/1941 | Shanklin | 156—48 |
| 2,531,156 | 11/1950 | Piercy et al. | 156—48 |
| 2,432,568 | 12/1947 | Gambitta | 174—25 X |

FOREIGN PATENTS

| | | |
|---|---|---|
| 553,716 | 6/1943 | Great Britain. |
| 579,018 | 7/1946 | Great Britain. |
| 1,016,739 | 1/1966 | Great Britain. |
| 756,588 | 5/1933 | France. |

OTHER REFERENCES

German printed application, 1,067,902, Pirelli Societa per Azioni Mailand, October 1959.

Trans. AIEE, vol. 67, part I, January 1948, pp. 447–459.

LEWIS H. MYERS, Primary Examiner

A. T. GRIMLEY, Assistant Examiner

U.S. Cl. X.R.

29—624; 117—65; 156—48; 252—63